(12) United States Patent
Lewis et al.

(10) Patent No.: US 12,415,551 B2
(45) Date of Patent: Sep. 16, 2025

(54) METHOD AND SYSTEMS FOR AN AUTOMATED RAILYARD

(71) Applicant: Transportation IP Holdings, LLC, Norwalk, CT (US)

(72) Inventors: Thomas Lewis, Erie, PA (US); Anthony D. Paul, Anchorage, AK (US); Ankit Mathur, Bengaluru (IN); Nathan North, Seattle, WA (US); James Brooks, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 914 days.

(21) Appl. No.: 17/644,533

(22) Filed: Dec. 15, 2021

(65) Prior Publication Data

US 2023/0182791 A1    Jun. 15, 2023

(51) Int. Cl.
*B61B 1/00* (2006.01)
*B61L 17/02* (2006.01)
(Continued)

(52) U.S. Cl.
CPC .............. *B61B 1/005* (2013.01); *B61L 17/02* (2013.01); *B61L 27/16* (2022.01); *B61L 27/37* (2022.01); *B65G 63/004* (2013.01); *B61J 1/02* (2013.01)

(58) Field of Classification Search
CPC .. B61B 1/00; B61B 1/005; B61B 1/02; B61D 3/16; B61L 17/02; B61L 27/16;
(Continued)

(56) References Cited

U.S. PATENT DOCUMENTS 3,991,889 A  *  11/1976  Cox ..................... B65G 63/025
                                              104/32.1
4,059,194 A  *  11/1977  Barry .................. B65G 63/045
                                              414/391
(Continued)

FOREIGN PATENT DOCUMENTS

DE             4440172 A1  *  5/1996  ............... B61B 1/02
DE            19740557 A1  *  5/1998  ............. B61B 1/005
WO    WO-2014131624 A1  *  9/2014  ........... B65G 63/025

OTHER PUBLICATIONS

Dirnberger, J., "Development and Application of Lean Railroading to Improve Classification Terminal Performance," Master's of Science in Civil Engineering Thesis, Montana State University, Available as Early as Jan. 2003, 145 pages.
(Continued)

*Primary Examiner* — S. Joseph Morano
*Assistant Examiner* — Cheng Lin
(74) *Attorney, Agent, or Firm* — K&L Gates LLP

(57) ABSTRACT

Various methods and systems are provided for a railyard system. In one example, a method for managing a railyard comprises, within the railyard, positioning a cargo unit on a multi-directional pad and moving the pad multi-directionally based on a requested order for the cargo unit relative to
(Continued)

other cargo units, where the requested order corresponds to an order of cargo units on railcars of an outbound train. The multi-directional pad may operate within an arena, where the arena includes a concrete surface depressed into the ground such that a surface of the pad is level with a surface of the ground surrounding the arena, thereby allowing railcars to be pushed onto the pad by a locomotive of a train.

19 Claims, 4 Drawing Sheets

(51) Int. Cl.
*B61L 27/16* (2022.01)
*B61L 27/37* (2022.01)
*B65G 63/00* (2006.01)
*B61J 1/02* (2006.01)

(58) Field of Classification Search
CPC .......... B61L 27/30; B61L 27/37; B61L 17/00; B61J 1/00; B61J 1/02; B61J 1/04; B61J 1/10; B61J 1/12; B61G 63/004; B65G 63/025
See application file for complete search history.

(56) References Cited

U.S. PATENT DOCUMENTS

| | | | |
|---|---|---|---|
| 8,156,872 B2* | 4/2012 | Hathaway | B61B 1/005 104/29 |
| 9,010,518 B2* | 4/2015 | Morgan | B61K 1/00 414/334 |
| 9,365,364 B1* | 6/2016 | Morgan | B65G 29/00 |
| 10,308,449 B2* | 6/2019 | Weidemann | B65G 63/025 |

OTHER PUBLICATIONS

Das, R., "BSP to roll world's longest single piece rail," Business Standard Website, Available Online at https://www.business-standard.com/article/companies/bsp-to-roll-world-s-longest-single-piece-rail-113060400005_1.html, Jun. 4, 2013, 8 pages.

"Track centreline distance," Trackopedia Website, Available Online at https://www.trackopedia.info/encyclopedia/maintenance-of-way/track-measurements/track-centreline-distance, Available as Early as May 6, 2019, 10 pages.

"Freight Rail & Preserving the Enviomment," AAR Website, Available Online at https://www.aar.org/wp-content/uploads/2020/06/AAR-Sustainability-Fact-Sheet.pdf, Available as Early as Jul. 17, 2020, 2 pages.

"Heavy Duty Caster Wheels," Chair Casters Website, Available Online at https://chaircasters.co.in/heavy-duty-caster-wheels.php, Available as Early as Sep. 28, 2020, 4 pages.

* cited by examiner

METHOD AND SYSTEMS FOR AN AUTOMATED RAILYARD

TECHNICAL FIELD

Embodiments of the subject matter disclosed herein relate to rail yards.

DISCUSSION OF ART

Freight trains are already four times more fuel efficient than trucks, moving one ton of freight 470+ miles with a single gallon of diesel. This gain comes from the lesser friction of metal wheels on metal tracks as compared to rubber on pavement. However, yard efficiency is measured by railcars processed—consistency and speed in sorting—not in locomotive fuel consumed. Thus, in-yard delays ("dwell") and similar taxes on throughput can allow yards to deflate any would-be network gains.

The mainline of the traditional railyard system is a track that is used for through trains and/or the principal artery of the system from which branch lines, yards, sidings and spurs are connected. The arrival and departure lines connect to the mainline to allow entry and exit from the traditional railyard system. The runner lines may allow for travel between the different areas of the traditional railyard system. For example, the runner lines connect the arrival and departure lines to the classifying lines and to the service lines of the locomotive services area. The locomotive services area may include an overhead operations system used for switching tracks, sorting, classifying, etc. The locomotive services may further include a maintenance shop for performing maintenance procedures on rail cars and locomotives.

The classifying lines are used to arrange and to organize railcars into planned outbound trains. This activity includes a dependency requiring a switch list, block plan, or other worklist to have been created prior to classification (knowing which railcars should be placed onto which tracks). Re-sorting, reclassifying, or otherwise changing classification tracks requires time to advance over track switches, resulting in a zigzag movement and recursively clearing rail ground switches to realign the switch positions/direction. This activity may involve both planned and unplanned tasks, which can create further delays.

Some regulations require railroad operators to perform a checklist of inspections of locomotives and railcars. These manual inspections include walk-around time and may be performed in different tracks or parts of the railyard, making automation challenging. "Bad order" (damaged) railcars may be found during inspections, which can introduce additional unplanned switching, delaying a train's departure, and often occupying the rail mainline, preventing other trains from departing.

In particular, intermodal operations can hinder the efficient transfer of goods within the railway system. Intermodal operations involve shifting containerized freight from one mode to another—for example, a truck trailer to a railroad chassis, or a barge to a truck trailer. However, this process often requires two carrier vehicles to be placed side-by-side to use a gantry crane or other equipment to lift the container from a first carrier vehicle and place the container in a second carrier vehicle. Delays can be introduced in waiting for trailers and/or chassis to be available and staged side-by-side, or for a crane to advance up and down the length of a queue with a container. For example, a current container may have to be placed before another container can be lifted. In high-volume facilities, this activity may be expedited by having many cranes or other expensive equipment.

Railyard throughput may be bound by an amount of track available rather than an amount of area available. Large amounts of space may be wasted or go unused, such as, for example, the minimum distance of 3.5 meters between each of the tracks in a traditional railyard. As the amount of available area is often greater than the amount of track available, an alternative framework that makes better use of space and reduces areas of unused or unusable space may increase throughput.

For illustration, a simplified traditional railyard system is shown as a line diagram in FIG. 1. FIG. 1 shows a line diagram of a traditional railyard system 100. The traditional railyard system 100 includes a mainline 102, arrival and departure lines 104, runner lines 106, classification lines 114, and a locomotive services area 120 with service lines 118.

Congestion may be reduced by expanding railyards to allow additional "sidings", which gives a yard operator more options of where to store cars. Turntables have also been used in the past, but the amount weight being turned caused mechanical failure at such a high rate that use of turntables is in decline. Thus, it may be desirable to have a system and method that differs from those that are currently available.

BRIEF DESCRIPTION

In one embodiment, a method is provided for managing a railyard. The method may include, within the railyard, positioning a cargo unit on a multi-directional pad and moving the pad multi-directionally based on a requested order for the cargo unit relative to other cargo units. The requested order may correspond, for example, to an order of cargo units on railcars of an outbound train. The multi-directional pad may operate within a virtual pond or arena, where the arena includes a surface that is depressed into the ground such that a top surface of the pad is about level with a surface of the ground or off ramp surrounding the arena.

In one embodiment, a controller may instruct the multi-directional pad to proceed to a first docking station to be loaded with a railcar decoupled from a first train, and subsequently proceed to a second docking station to allow the railcar to be coupled to a second train. In this way, trains may be broken down and built up in a faster and more efficient manner. By relying on autonomous vehicles to transfer cargo from a first mode of transport to a second mode of transport, rather than using classification tracks, traditional carrier vehicles, and switch lists, an overall efficiency of the railyard may be increased. Inspections, loading and unloading of cargo units, and coupling and decoupling of railcars may be carried out at fixed locations so that physically walking around the railyard and accumulating transloading equipment at various locations may be reduced.

BRIEF DESCRIPTION OF THE DRAWINGS

The invention will be better understood from reading the following description of non-limiting embodiments, with reference to the attached drawings, wherein below.

DETAILED DESCRIPTION

This description and embodiments of the subject matter disclosed herein relate to a method and system for railyard infrastructure. Goods transported in cargo units (e.g., containers, truck chassis, etc.) may be received at a railyard via a first mode of transport, such as on a railcar of a train, on a truck, or on a ship, and may be transported out of the railyard by a second mode of transport (which may be the same as the first mode of transport). For example, a container may be unloaded from a railcar of a first train at an inbound docking station, transported to an outbound docking station where it may be loaded on a ship, truck, or second train for subsequent transportation. However, efficiency in moving goods through a railyard suffers from a reliance on replanning, reclassification, reorganizing storage, and recreating worklists that slows down throughput when plan changes become necessary.

In light of this, systems and methods are disclosed herein for operating and/or organizing railyard infrastructure for increased efficiency and throughput. Reference is made to a pond and lily pad metaphor. As described in greater detail below, multi-directional, autonomous vehicles structured as flat pads may operate on a flat, omni-directional surface (e.g., a "pond" or "arena"), where the pads may receive and transport cargo units from the first mode of transport to the second mode of transport in a fluid and easily reorganizable manner. By using the pads, trains may be broken down and built on-demand, with flexible and short-notice request handling.

Figure 1:
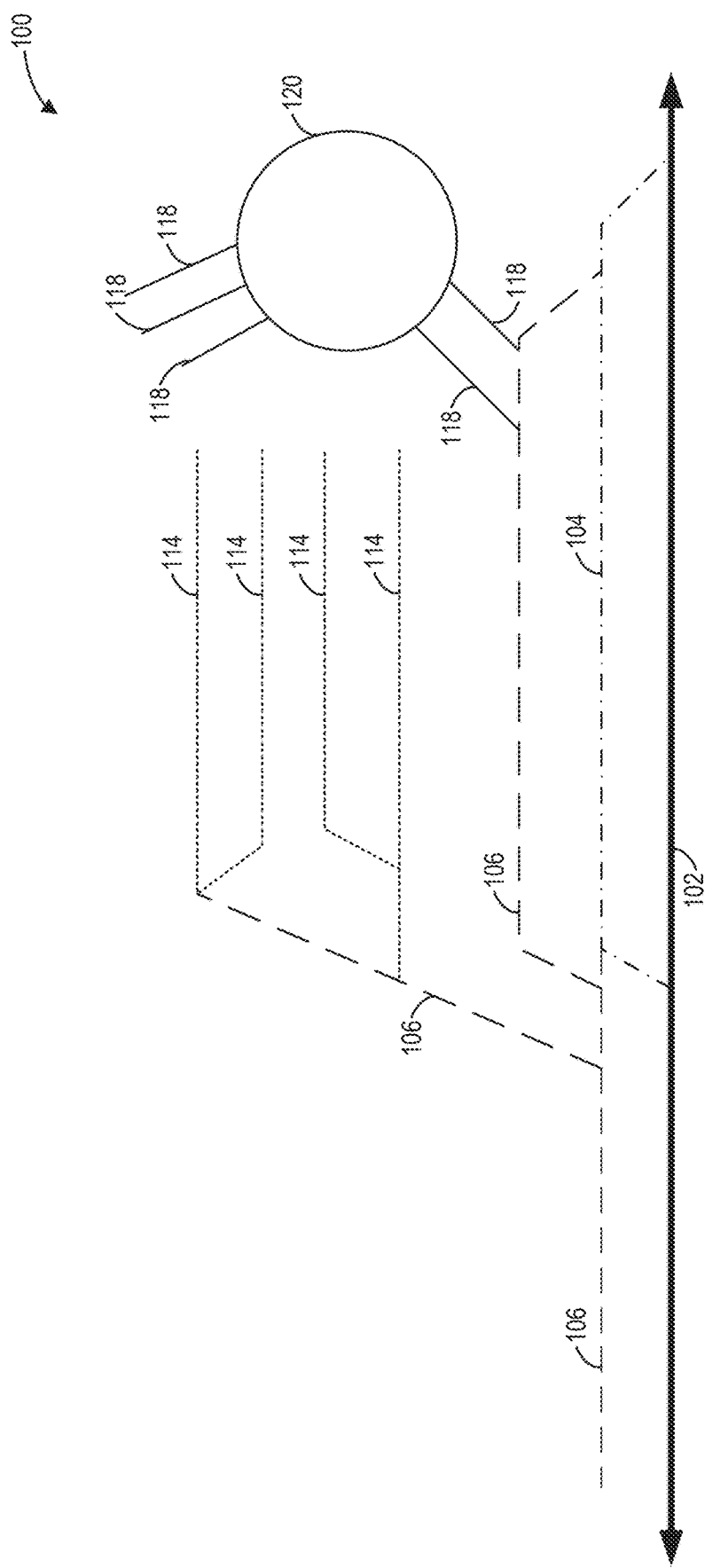
FIG. 1 shows a line diagram of a traditional railyard system.
Figure 2:
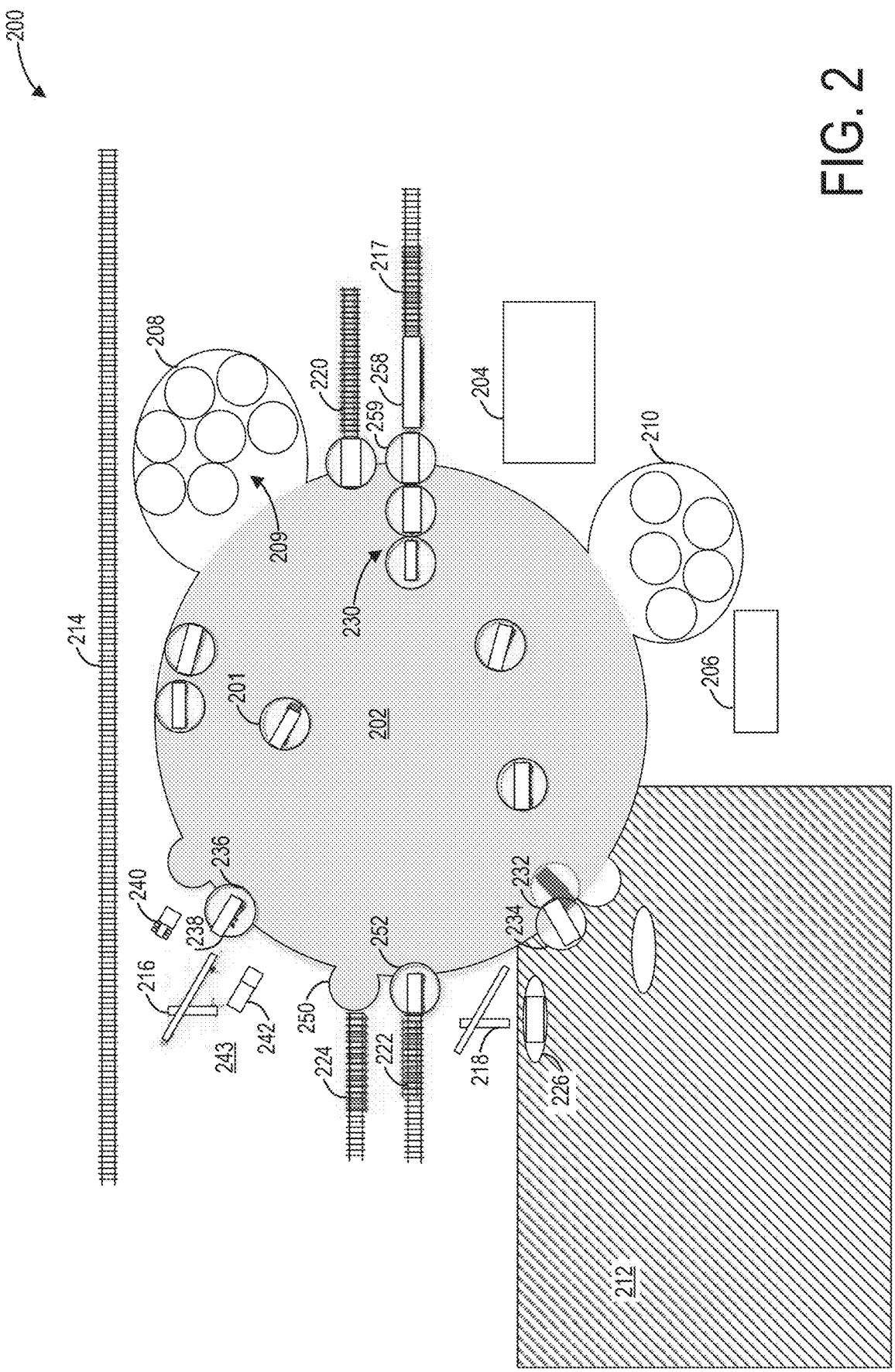
FIG. 2 shows an embodiment of an exemplary arena railyard system based on a pond and lily pad metaphor.
Figure 3:
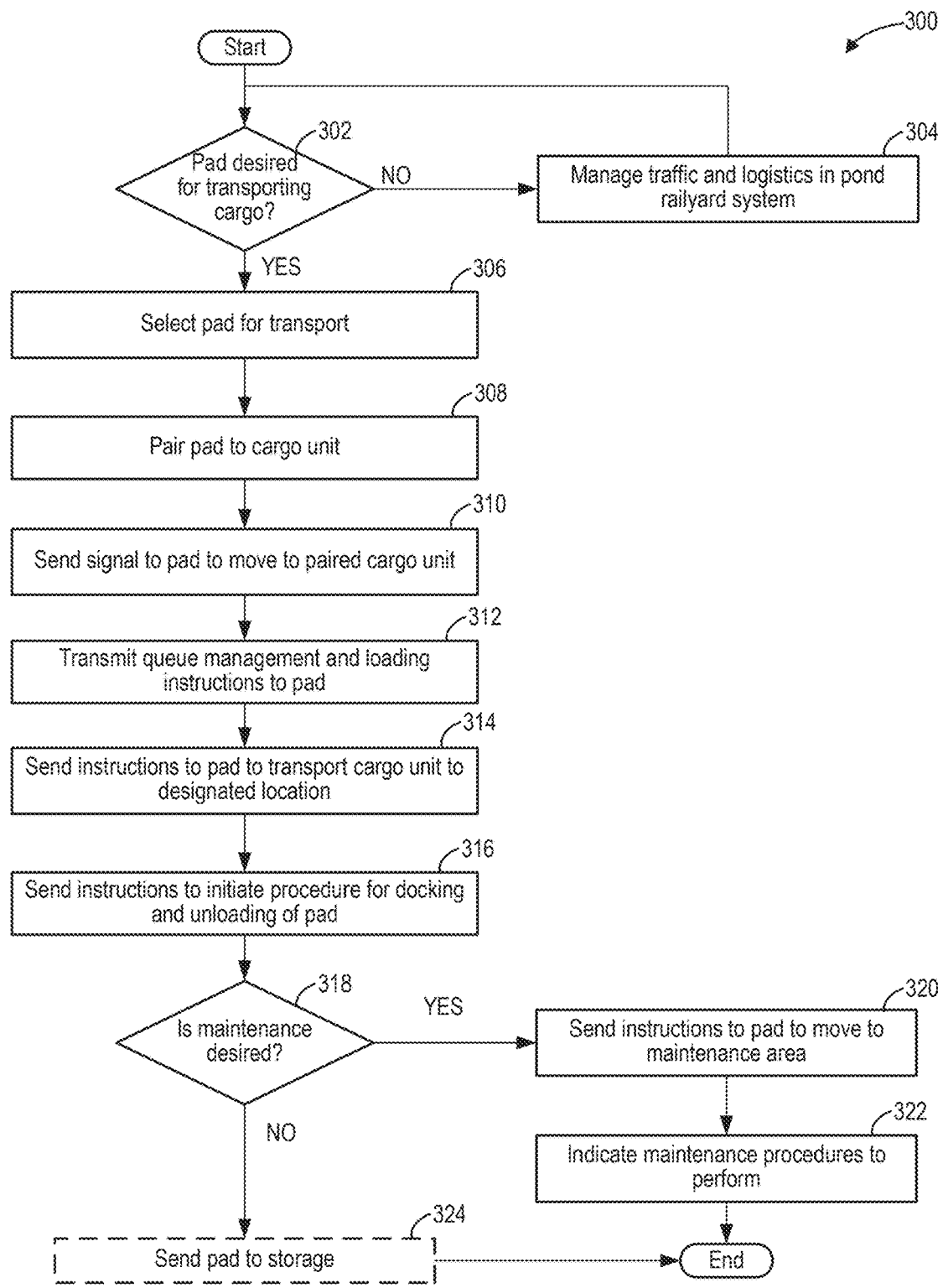
FIG. 3 is a flowchart illustrating an exemplary method for a controller to control movement of pads in the arena railyard system.
Figure 4:
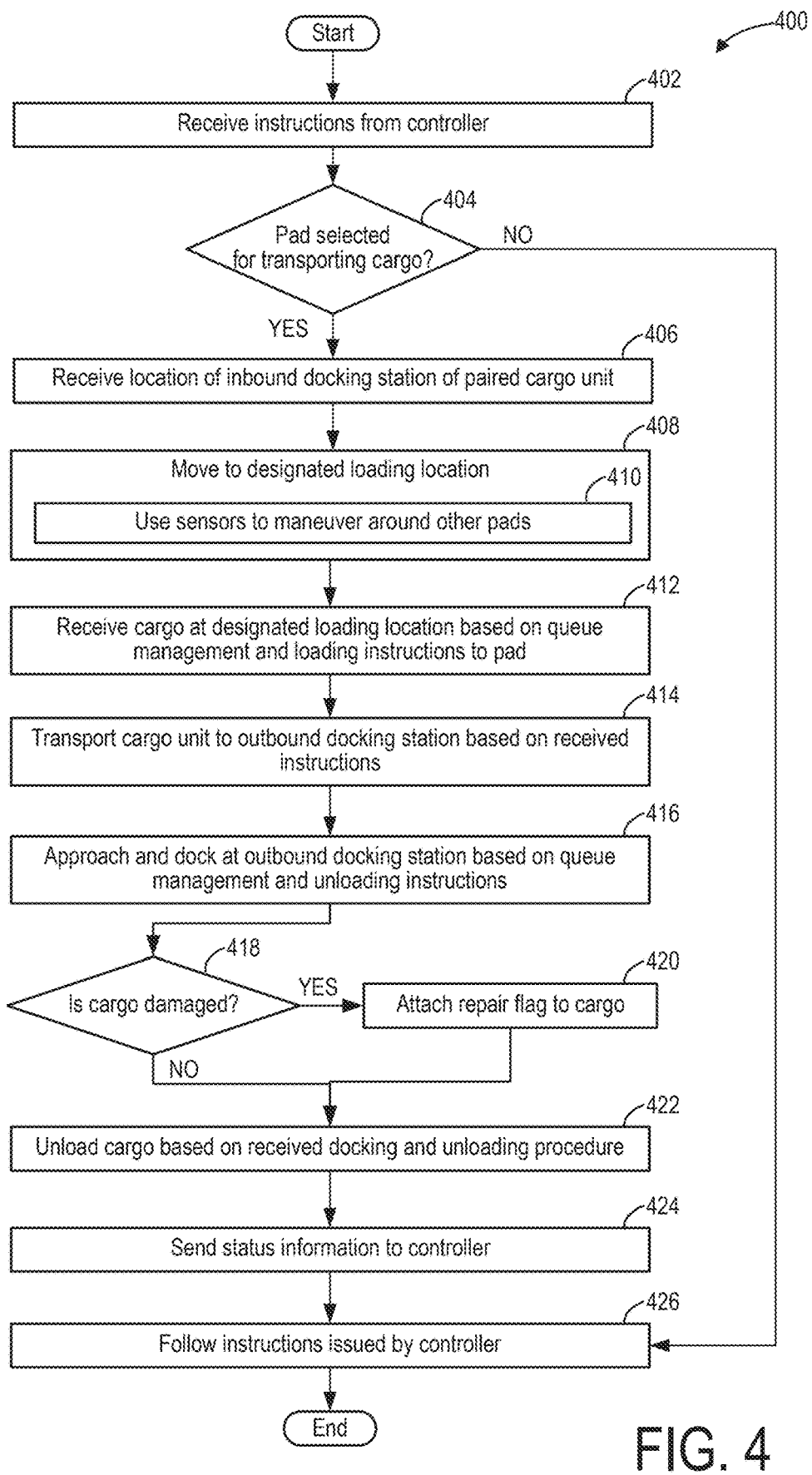
FIG. 4 is a flowchart illustrating an exemplary method for a pad moving within the arena railyard system based on instructions issued by the controller.

An embodiment is shown with reference to a diagram of an arena railyard system, which includes connections for a marina and cargo trucks, in FIG. 2. A method for a controller to control movement of pads in the arena railyard system is shown in FIG. 3, and a method for a pad moving within the arena railyard system based on instructions issued by a controller is shown in FIG. 4.

With reference to FIG. 2, an example arena railyard system 200 is shown. The arena railyard system includes a pad 201, an arena 202 connected to a marina 212 and a truck yard 243. In other examples, the arena railyard system may not include the marina and/or may not include the truck yard. For example, the arena railyard system may be used for railcars and cargo brought to the arena railyard system by train and/or trucks and not by ships, or the arena railyard system may be used for containers brought to the arena railyard system by ships and not by trucks. Further, the arena railyard system may include any combination of the marina and the truck yard with the arena. For example, the arena railyard system may only include the arena, may include the arena and the truck yard, may include the arena and the marina, or may include the arena, truck yard, and the marina.

The arena railyard system may include a plurality of multi-directional pads. In the illustrated embodiment, the pad is a circular, puck-like entity that may move in a plurality of directions and/or be arranged freely within the arena. In various embodiments, the arena may be an area that provides a smooth, concrete surface for the movement of pads in the arena railyard system. In other embodiments, the arena may not be made of concrete, and may be made of or include a protective layer of another material, such as metal, rubber, plastic, etc. The arena may be depressed inside the ground such that a top surface of the pads is at the same height as the ground level of the area surrounding the arena. In other embodiments, the arena may include a body of water or a different liquid upon which the pads totally or partially float, or the arena may be a different kind of surface on which the pads may move. In particular, a pair of rails or the equivalent may be supported on the pad top surface and the rails may match up (height-wise) to corresponding rails on the ground adjacent to the arena. In one embodiment, the pad may allow railcars to be pushed onto the pad by a mover vehicle.

Various inbound and outbound docking stations for railways, marina, and roadways may be arranged around a perimeter of the arena, as demanded by the yard. As shown in FIG. 2, there may be inbound and outbound docking stations for each of the railways, the marina, and the truck yard. In other embodiments, there may be more or less docking stations for each area. For example, there may be one, two, three, four, etc. docking stations for each of the areas. The docking stations are shown in FIG. 2 as circular so that the circular pads may fit within the docking stations. In other examples, the docking stations and/or the pads may be a different shape, such as rectangular.

In one embodiment, each pad may be an autonomous vehicle. In various embodiments, each pad may be a fully autonomous, modular electric vehicle having processing, communication, a power source, and sensing capabilities present on board allowing it to interact with other pads and/or elements of the arena railyard system and react to the environment. In another embodiment, each pad may be remotely controlled from, for example, a control tower that allows an overlook of the pond arena. In one embodiment, the pad includes an interface device that allows for charging of the pad when coupled to a charging unit. One pad may chain power to another pad to recharge plural pads simultaneously from a single charging unit. Other pads may have wireless charging capabilities.

Each pad may be able to carry a single cargo unit, meaning one container, one empty trailer or truck chassis, or one loaded trailer or truck chassis on its surface. The pad may be calibrated to handle heavy loads and have a plurality (e.g., a minimum of five) castor wheels below it (e.g., such as those used in the airline industry for high load capacities), allowing movement in a plurality of directions (e.g., a multi-directional pad). For example, the pad may be configured to move in a forward direction, a reverse direction, and to each side. The pad may rotate freely. The rotation may be in a clockwise or counterclockwise direction. In some embodiments, moving in the plurality of directions may be accomplished by first rotating the pad so that the pad is facing a desired direction, and subsequently moving the pad in the desired direction. The direction and alignment of the pad may be used to orient the cargo unit on the pad so that it is properly aligned upon departure from the pad. In one embodiment, the pad includes sensors that can detect the orientation of the cargo unit on it and respond to that orientation to align itself.

A surface of the pad may be flat and made of steel or similar hard material, so that a cargo unit (e.g., a container, or a truck chassis, or a different unit of cargo) may be placed upon it. In some embodiments, the surface may be smooth, for example, so that a railcar may be pushed onto the pad by a locomotive of a train. Once the railcar is positioned on the pad, the railcar may be detached from the train. The pad and the railcar on it may be moved to a different location within the arena, such as an outbound docking station where a different train may be loading. A length or diameter of the pad may be at least as long as a longest railcar (e.g., 30 meters) to allow selected types of railcar to fit on it. Alternatively, a truck chassis may be positioned on the pad, and the pad may subsequently move or be moved to an outbound docking station where trucks may receive the chassis for over-land transportation of the cargo. In one embodiment, plural pads may work cooperatively to carry a cargo unit that is greater than a single pad's length.

In other embodiments, the surface may be rough or textured, such that a unit of cargo placed upon it by a crane is less likely to slide. For example, the surface may include bumps, or raised lines, or a similar type of texturing. It still other embodiments, the pads may not all be of a same type, and some of the pads may be smooth and some of the pads may be textured, or some of the pads may be circular and some of the pads may be rectangular or a different shape, and so forth.

In one embodiment, the pad may include manipulators. Suitable manipulators may perform functions relative to the cargo unit. Examples of manipulator actions may include acting as brakes or chocks to prevent movement, stabilizers to prevent sway, actuators to move sensor packages relative to the cargo unit, actuators to enable or disable brake systems on the cargo unit, and the like. Suitable sensor packages may be used to inspect aspects of the cargo unit while it is engaging with the pad.

The size of the arena may be dependent on the traffic of railcars and/or other cargo received by a specific railyard. For example, a railyard that experiences increased traffic may result in a larger arena being constructed to accommodate the increased traffic. For a railyard with less traffic, a smaller arena may be desired.

A supervisory controller 204 may receive and send signals from and to the pads, inbound and outbound trains, boats, and trucks. In various embodiments, the controller may be in a building where a user may be able to interact with the controller via a display and user interface to further input information or receive information such as a location of each pad, whether the pad should be scheduled for maintenance, what cargo a pad is transporting, a destination of the pad, and so forth. The controller may send signals indicating, for example, a desired staging or ultimate location for a pad to move to, a different pad to connect to, instructions for the pad to remain on standby, or a different signal. For example, the controller may send a signal to a pad positioned under a gantry or crane that has been loaded with a container to move to an open area of the arena, to allow space for a different pad to be positioned under the gantry or crane to be loaded with cargo.

At an inbound docking station 259, a locomotive 258 on an incoming track 217 may push a railcar onto a pad at a pad queue 230. For example, each of the pads at the pad queue may be lined up in an order corresponding to an order of railcars attached to the locomotive, such that each railcar may be paired with a specific pad with instructions to transport the railcar to a certain destination. In some embodiments, the pads in the pad queue may be connected to each other. The pads at the pad queue may subsequently exchange goods with other modes of transport such as trucks (e.g., at the truck yard) or ships (e.g., at the marina), or trains (e.g., at an outbound docking station 250). Additionally, railcars from one train may be dispatched onto pads in a first order, and the pads may move to and subsequently queue up one after the other at a second pad queue at the outbound docking station in a second order, to allow for an efficient makeup of a new train in the second order. Further, pads with railcars or other cargo received from a different inbound docking station may be inserted into the second pad queue and the second order. In this way, cargo units may be received and dispatched to different locations on the arena corresponding to the different modes of transport in an efficient and fluid manner.

Pads may allow for faster exchange and transloading of containers between railways, roadways, and marine ports. For example, if a container needs to be moved from a truck chassis, such as a truck chassis 240, to a railcar, a pad carrying the railcar may be positioned in front of a truck docking station 238 of the truck yard having a crane 216 at the edge. The crane may lift the container off the truck chassis and may place the container onto the railcar. The pad (e.g., a loaded pad 236) may then exit the truck docking station to make way for a pad containing a different railcar or other container to enter the truck docking station. Alternatively, the crane may lift a container from a railcar on the loaded pad 236 and place the container onto the truck chassis to be shipped out by truck. Since the pads may be operated at increased speeds as compared to the traditional methods of building trains, the transloading may happen at a faster rate. Pads may allow cargo to be loaded and unloaded without accumulating all the transloading equipment at one destination, or rely on carrier vehicles being placed side-by-side with trains.

Similarly to the truck yard, the marina may include a crane 218, which may be used to remove a container from a water vessel, such as a ship 226, and place the container onto a pad, such as a pad 232 within a marina docking station 234. The pad is shown carrying a railcar for the container from the ship to be placed on. However, in other examples, pad may be empty, and the container may be placed directly on top of the pad. The pad may then be able to move to the truck docking station to be loaded onto a truck chassis by crane 216, or the pad may move to the outbound docking station 250 to be built into an outgoing train.

For example, a first train may arrive at the inbound docking station 259. At the inbound docking station, a locomotive of the first train may push a first railcar of the first train onto a first pad waiting in the pad queue. After the first railcar is pushed onto the first pad, the first pad may move (or be moved by an operator) away from the inbound docking station, and a second pad of the pad queue may move into position to receive a second railcar of the first train. The locomotive of the first train may push the second railcar of the first train onto the second pad. After the second railcar has been pushed onto the second pad, the second pad may move away from the inbound docking station, so that a third pad of the pad queue may move into position to receive a third railcar of the first train. The locomotive of the first train may push the third railcar of the first train onto the third pad. After the third railcar has been pushed onto the third pad, the third pad may move away from the inbound docking station. Subsequently, the first pad may move to the marina docking station, where a container of the first railcar may be removed from the first pad by crane 218 and placed upon ship 226. The first pad may then move or be moved to truck docking station 238, where a container from truck chassis 240 may be loaded onto the first railcar positioned on the first pad. The first pad may then navigate to the outbound docking station 250, where the first railcar of the first train may be attached to a locomotive or railcar of a second train, which may transport the container to another location. In some examples, there may not be a designated inbound/ outbound docking stations and instead the docking stations may allow for both inbound train deconstruction and outbound train construction.

When a pad is not desired to be used, it may be stored in a storage area 208. Similar to the arena, the storage area may be a concrete depression in the ground where the depression is the same depth as the height of the pad. In the arena railyard system of FIG. 2, the storage area is shown as a circular extension of the arena. However, the storage area may also be square, rectangular, triangular, oblong, etc. An amount of pads 209 within the storage area may fluctuate as traffic within the arena increases and decreases. For example, as traffic increases, the amount of pads within the storage area may decrease, and as traffic decreases, the amount of pads within the storage area may increase.

A maintenance area 210 may also be included as a part of the arena railyard system. Pads may be signaled by the controller to go to the maintenance area to receive maintenance. The maintenance area may include a shop 206 for a worker (e.g., a mechanic) to perform physical maintenance procedures on the pads.

Moving now to FIG. 3, an exemplary method 300 is shown for a controller to communicate with and control the movement of pads in an arena railyard system, such as arena railyard system 200 of FIG. 2. The controller may be the same as or substantially similar to controller 204 from FIG. 2. Instructions for carrying out the method and the rest of the methods included herein may be executed by the controller based on instructions stored on a memory of the controller.

At step 302, the method includes determining if a pad is desired for transporting cargo, for example, from an inbound docking station to an outbound docking station of the railyard. A pad may be desired if there is an unpaired railcar, freight container, or other unit of cargo at or arriving at the arena railyard system that is desired to be moved within the arena railyard system. A pad may not be desired if incoming railcars, freight containers, etc. are already paired with other pads. If at step 302 it is determined that a pad is not desired, the method proceeds to step 304.

At step 304, the method includes managing traffic and logistics in the arena railyard system. In other words, if no pads are desired for the transportation of goods from one mode of transport to another mode of transport (e.g., from trains to ships, or from ships to trucks, etc.) the controller may dedicate itself to managing a population of pads in traffic or in storage at the time. For example, a large number of pads may be trafficking from a specific inbound docking station to a specific outbound docking station, or from one specific mode of transport to another specific mode of transport, thereby creating traffic jams that impede the flow of other cargo in the arena railyard system. To alleviate the traffic jams, the controller may transmit instructions to the pads to slow down or speed up various pads within the system, or may temporarily divert various pads from a first path through the arena railyard system to a second path through the arena railyard system to allow goods and cargo to reach their destination in a more efficient manner. The controller may also send one or more unused pads that may be obstacles to traffic to a storage area, such as the storage area 208 of FIG. 2.

Additionally, the controller may execute remote maintenance routine checks on pads not in use transporting cargo to determine if any should be scheduled for maintenance. In some embodiments, the pads may receive routine check-ups after a period of time during which they are in use elapses. In other embodiments, a pad may include self-diagnostic systems to determine whether the pad should be scheduled to have maintenance performed, whereby the pad may send signals to the controller indicating a request for maintenance. In general, the controller may carry out or undertake any kind of diagnostic, logistic, agents, or other routines that may facilitate the free flow of goods throughout the arena railyard system until a pad may be desired for transport.

If at step 302 it is determined that a pad is desired for transporting a unit of cargo, the method proceeds to step 306. At step 306, the method includes selecting a suitable pad for transporting the unit of cargo. Selecting a suitable pad for transport may include determining which of a plurality of unused pads may be most suitable for use in a specific transportation task. For example, in response to the controller detecting a train carrying containers arriving at an inbound docking station, the controller may look up a number of railcars of the train. The controller may determine that an equal number of pads should be sent to queue up at the inbound docking station (e.g., pad queue of FIG. 2) to receive the units of cargo from the railcars. Thus, a first unpaired pad in close proximity to the inbound docking station may be selected to queue up at the inbound docking station, while a second, unpaired pad not in close proximity to the inbound docking station may not be selected to queue up at the inbound docking station, due to a greater distance that the second unpaired pad may have to travel. As another example, a pad may not be selected to be used if stored behind other, unused pads, or if maintenance is scheduled to be performed on the pad.

At step 308, the method includes pairing the pad to a cargo unit to be transported by the pad to a designated location within the arena railyard system. As described above, the cargo unit may be a railcar, truck chassis, a container, or a different cargo unit. In some embodiments, pairing the pad to the cargo unit may include pairing an identity number of the pad to an identity number of the cargo unit. In other words, each railcar, truck chassis, container, etc. may be assigned an identity number or code, for example, in electronic records stored and/or received by the controller when a train or different mode of transport arrives at the railyard. In some embodiments, pads may be instructed to queue up at an inbound docking station prior to pairing the cargo units with the pads, and pairing of a cargo unit to a pad may not occur until the cargo unit is loaded onto the pad.

At step 310, the method includes sending instructions to the pad to move to the cargo unit to which it has been paired. In various embodiments, the signal may be a wireless signal (e.g., a Wi-Fi signal, radio signal, etc.) transmitted via a wireless network established in the arena railyard system from a transmitting device of the controller to a receiving device of the pad. The signal may include, for example, a code of an inbound docking station to which the pad is assigned, a position of the pad within a queue to be formed at the docking station, the identity number of the cargo unit to which the pad has been paired, as well as other information.

In some embodiments the pad may have operating parameters or settings that may be adjusted based on information transmitted in the signal. For example, the signal may include an estimated weight of the cargo unit, and in response to receiving the estimated weight of the cargo unit, the pad may adjust a maximum speed of the pad once loaded, or a turning radius of a path the pad may take from an inbound docking station to an outbound docking station.

At step 312, the method includes transmitting queue management and loading instructions to pad. In various embodiments, transmitting the queue management and loading instructions may include selecting and initiating one or more procedures for managing pad queue configurations and/or maneuvering into position. For example, under some circumstances, instructions may be transmitted for pads to queue up at the inbound docking station in a straight line in preparation to receive incoming railcars, and other different circumstances, instructions may be transmitted for a queue size not to exceed a number of pads, with pads in excess of the number waiting to enter the queue at an assigned staging area. Alternatively, under some circumstances pad may be instructed to form a queue that is not linear, for example, a queue that curves around an edge of the arena railyard system (e.g., to not create obstacles to other traffic on the arena).

The queue management and loading instructions may also include instructions on how to maneuver the pad to receive the cargo unit and exit the inbound docking station. For example, pads may be instructed to approach the inbound docking station from a certain angle and/or at a certain maximum velocity; to physically dock at the inbound docking station in accordance with one or more docking protocols; to receive manual confirmation of docking by an operator of the docking station; to enter the inbound docking station from a designated side and to exit the inbound docking station once loaded at a different designated side or designated direction; and so forth. In some embodiments, the pad may be instructed to execute one or more autonomous management routines, whereby the pad may interact with the docking station and/or other pads in accordance with various different interaction and maneuvering protocols based on sensors of the pad and instructions stored in a memory of a controller of the pad. For example, the pad may be programmed to maneuver around other pads in accordance with a framework of traffic rules, and/or the pad may be programmed to proceed directly to dock at the inbound docking station based on certain cues detected by sensors of the pad (e.g., a presence of open space at the inbound docking station, detection of a green light or similar visual cue at the inbound docking station, etc.). In some embodiments, the pad may maneuver and interact with the docking station and/or other pads based on a combination of autonomous management routines and operator instructions issued by the controller of the arena railyard system.

As an example, a train arriving at the arena railyard system may transmit to the controller information about the train, which may include a number of railcars included in the train and an identity number of each railcar. The controller may receive the information, and based on the number of railcars, assign an equal number of pads to queue up at an inbound docking station of the arena railyard system. To assign the equal number of pads to queue up, the controller may first select the equal number of pads from a total population of pads in the arena railyard system, as described above. For example, the pad may be selected based on an algorithm that takes into consideration a location of a candidate pad, a status of the candidate pad, a maintenance schedule of a candidate pad, and/or other characteristics of the candidate pad. In some embodiments, the pad may be selected based on or based partly on manual input received from an operator of the controller. For example, the operator may be aware of characteristics of a pad or a cargo unit that might affect the pairing that are not captured in the electronic records, such as a condition of a surface of a specific pad (e.g., scratched, oily, etc.), a fragility of the cargo unit, a size or weight of the cargo unit, etc. The operator may use this information to manually select a suitable pad for the cargo unit, or to override a selection of a suitable pad made by the algorithm.

When a suitable pad is selected from the total population of pads to queue up at the inbound docking station, an identity number of each suitable pad may be paired with an identity number of a corresponding railcar of the arriving train. Thus, an identity number of a first pad may be paired with an identity number of a first railcar, an identity number of a second pad may be paired with an identity number of a second railcar, and so on. Based on the identity number pairings, the first pad may be assigned (e.g., in the queue management and loading instructions) a first position in the queue, the second pad may be assigned a second position of the queue, and so on, to ensure that an order of pad in the queue corresponds to an order of railcars of the train. Alternatively, the pads may be instructed to queue up without assigning positions in the queue. When the train arrives, a locomotive of the train may push the railcars of the train onto the pads one by one, such that each railcar is loaded onto the pad with which it has been paired, or such that the railcars are paired with the pads as they are loaded. The queue management and loading instructions may further indicate how the pads approach and dock with the inbound docking station, from which direction, and how to exit the inbound docking station after the units of cargo have been loaded.

At step 314, the method includes sending a signal to the pad to transport the cargo unit to a designated location. In some situations, the designated location may be known by the controller at the time of selecting and assigning the suitable pads and may be transmitted to the pad in advance. In other situations, the designated location may not be known by the controller at the time of selecting and assigning the suitable pads, and may be received by the controller and transmitted to the pads after loading. In some embodiments, instructions with respect to how to navigate or maneuver across or around the arena may be transmitted to pad. For example, the controller may command the pad to proceed directly along a linear path to an outbound docking station, or the controller may indicate to the pad a designated path (e.g., a curved path or a detour) to follow to arrive at the outbound docking station, to avoid other traffic on the arena and/or to efficiently manage a high volume of traffic on the arena. Under some circumstances, the controller may command the pad to proceed to a secondary staging area to await instructions, for example, if the pad is transporting cargo that will be loaded onto a train at a later stage of a loading process. Further, under some circumstances, the controller may command the pad to proceed to a storage area (e.g., storage area 208 of FIG. 2) to store the pad with its cargo unit loaded on it until a later time.

When the pad arrives at the designated location (e.g., an outbound docking station), at step 316, the method includes sending a instructions to initiate one or more procedures for docking and loading. The procedures for docking and loading may be similar to the procedures described above for docking and unloading at the inbound docking station. For example, the pad may be instructed to wait in a queue, proceed to dock at the docking station, await notification or detection that the cargo unit has been unloaded off the pad, and to exit the docking station in a convenient direction in accordance with autonomous programming of the pad, or a combination of the autonomous programming of the pad and operator instructions.

In some embodiments, the units of cargo may be inspected at either or both of the inbound docking station and the outbound docking station. For example, the units of cargo may be inspected at a time of coupling and/or decoupling railcars to or from a train. Some regulations may require railroad operators to perform a checklist of inspections of locomotives and railcars. The inspection may be performed on different tracks or parts of the railyard. A difference between an arena railyard system relative to a traditional railyard system is that within the arena railyard system the locations for both coupling/decoupling and the inspection would be static, a duration of such operations may be faster. This may be, in part, due to an inspector not having to physically move across the yard to perform them. Additionally, static locations would also allow for future automation or robotics to assist in some or all part of coupling/decoupling and inspection tasks, without needing to have full coverage of the facility. For example, a mounted robot could be positioned to couple or decouple cars, shifting each one into position one at a time. The implementation of new automation solutions may no longer be reliant on mobile carrier vehicles, whose movement is restricted. Additionally, these inspections may be performed during periods of non-work, when trains are neither being assembled or disassembled, to proactively expedite the assembling and outbounding process and minimize the number of unexpected "bad order" railcars encountered during scheduled work tasks.

At step 318, the method may include determining whether maintenance of the pad is desired. As maintenance tasks may arise at any time, one or more diagnostic routines of the pad may be carried out regularly, such as after a cargo unit has been unloaded from the pad. For example, during unloading of the pad, a surface of the pad may become damaged, impairing the ability of the pad to continue to operate normally and receive further loads for transport. In some embodiments, the pad may run local diagnostic routines to determine whether maintenance should be scheduled. For example, in response to a result of a local diagnostic routine, the pad may determine that maintenance should be scheduled and may send a request to the controller to be sent for maintenance. Alternatively, the controller may send a request to the pad to initiate one or more diagnostic routines and return a result.

In other embodiments, the controller may determine whether maintenance of the pad should be scheduled based on performance criteria of the pad. For example, the controller may detect that a docking of the pad was not performed adequately, or may detect irregularities or delays in approaching and/or exiting a docking station. In response to detecting the inadequate performance, irregularities, and/or delays, the controller may determine that the pad should be scheduled for maintenance.

In still other embodiments, the controller may determine that the pad should be scheduled for maintenance based on data collected by the controller, such as how long a pad has been in operation, a length of time since a last maintenance check, an average weight transported by the pad, or different data of the pad.

If it is determined that maintenance of the pad is desired at step 318, the method proceeds to step 320. At step 320, the method includes sending instructions to the pad to move to the maintenance area. For example, the controller may send a wireless signal to the pad to indicate the desired maintenance location for the pad to navigate to (e.g., maintenance area 210 of FIG. 2).

At step 322, the method includes indicating one or more maintenance procedures to be performed on the pad. In some embodiments, the controller may receive diagnostics from the pad, which the controller uses to determine what maintenance procedures are desired to be performed. The controller may signal to a user (e.g., a mechanic) through a display whether physical maintenance is desired. Additionally, the pad may communicate diagnostic information to the user that is not transmitted to the controller. As another example, if software maintenance is desired, the controller may be able to perform updates to the pad by sending data packets with the update to the pad. The method may then end.

Returning to step 318, if maintenance is not desired, the method continues to step 324. At step 324, the method includes sending instructions to the pad to move to a storage area (e.g., the storage area 208) or a temporary staging area on the arena, where the pad may await further instructions and/or commands without hindering other traffic in the arena railyard system. The method may then end.

Turning now to FIG. 4, an exemplary method 400 is shown for receiving, at a pad, instructions from one or more external controllers for moving within an arena of an arena railyard system. Instructions for carrying out the method may be stored in a memory of a local controller of the pad, which may be in wireless communication with the one or more external controllers and other pads.

At step 402, the method includes receiving instructions from an external controller of the one or more external controllers. In various embodiments, the external controller may be the supervisory controller overseeing commands for all the pads (e.g., controller 204 of FIG. 2). In other embodiments, the external controller may be different from the supervisory controller. For example, the pad may receive instructions transmitted by a first, supervisory controller until reaching a threshold distance from a docking station that the pad is approaching, and when the pad enters within the threshold distance, a second external controller at the docking station may issue instructions to the pad regarding a docking procedure at the docking station. When the pad exits the threshold distance after receiving cargo, the pad may receive instructions from the first, supervisory controller and not from the second controller at the docking station. In still other embodiments, a plurality of external controllers of the arena railyard system may issue instructions to the pad, and in the event of conflicting instructions the pad may determine which instructions to follow based on a determined protocol.

At step 404, the method includes determining (e.g., based on the received instructions) whether the pad has been selected for transporting a cargo unit received, for example, at an inbound docking station of the arena railyard system. As described above in reference to method 500 of FIG. 5, the pad may be selected for transporting a cargo unit based on a proximity of the pad to a destination where the cargo unit may be received. If at 404 it is determined from the received instructions that the pad has not been selected for transporting a cargo unit, the method proceeds to step 422. At step 422, the method includes following the instructions issued by the external controller. For example, if the pad has not been selected for transporting a cargo unit, the instructions issued by the external controller may be that the pad should proceed to a storage area (e.g., storage area 208 of FIG. 2) to await further instructions, or to proceed to a maintenance area (e.g., maintenance area 210 of FIG. 2) to undertake maintenance of the pad, or to follow a different set of instructions. Under some circumstances, the instructions issued to the pad by the external controller may indicate to the local controller of the pad that the pad should remain in a standby mode awaiting future instructions. The method may then end.

Alternatively, if at step 404 it is determined from the instructions that the pad has been selected for transporting a cargo unit, the method proceeds to step 406. At step 406, the method includes receiving a location of an inbound docking station of a paired cargo unit. For example, as described above in reference to method 500, the external controller may pair the pad (e.g., based on an identity code or number) with a cargo unit, or with a railcar or truck chassis on which the cargo unit has been loaded. A pairing of the pad with a designated cargo unit may indicate or include instructions for the pad to navigate to the inbound docking station of the paired cargo unit to be loaded.

In other embodiments, when the pad has been selected for transporting a cargo unit, the pad may not be paired with a specific cargo unit, and may rather be instructed to proceed to the inbound docking station to be paired with a cargo unit upon loading. For example, at a time of instructing the pad to proceed at a location for loading, information about a specific cargo unit to be loaded on the pad may not be available or useful for the pad to carry out a loading task.

At step 408, the method includes moving to a designated loading location. In some embodiments, the external controller may provide instructions as to how the pad should move to the designated loading location. For example, the external controller may dictate a path that the pad should take to arrive at the designated loading location, such as a straight path, or a curved path to avoid traffic within the arena, or a more complicated path that may involve changing directions at various intermediate points along the path. Additionally, the external controller may provide instructions regarding a maximum acceleration and/or a maximum velocity that the pad should not exceed in navigating to the designated loading location. For example, if there is a large number of pads trafficking within the arena, the external controller may establish a low maximum velocity that the pad should not exceed, and if there is a smaller number of pads trafficking within the arena, the external controller may establish a higher maximum velocity that the pad should not exceed. In other embodiments, the external controller may not provide instructions as to how the pad should move to the designated loading location, whereby the pad may select an appropriate path to the designated loading location based on one or more traffic or maneuvering protocols installed at the pad, or other information stored or generated locally at the pad.

At step 410, moving to the designated loading location may include using sensors to maneuver around other pads. For example, the pad may include motion sensors and/or proximity sensors that the local controller of the pad may use to determine whether other pads are within a threshold distance of the pad. If it is determined that one or more other pads are within the threshold distance of the pad and may constitute obstacles to a movement of the pad, the local controller may adjust the movement or path of the pad to avert a potential collision with the other pads. In some embodiments, the threshold distance may be calculated dynamically based on a velocity of the pad. Further, the local controller of the pad may communicate with local controllers of other pads trafficking within the arena, whereby information about a most efficient path to take to reach the designated loading location may be shared between the pads. As a result of receiving information about a most efficient path to take from one or more other local controllers of the other pads, the local controller of the pad may adjust the path, velocity, or other parameters to increase in efficiency of the pad in reaching the designated loading location.

When the pad reaches the designated loading location, at step 412, the method includes receiving the paired cargo unit based on queue management and loading instructions sent to the pad by the external controller. The queue management instructions may include, for example, instructions regarding how and where a pad queue should be formed, such as from which direction the pad should approach and/or exit the inbound docking station, whether the pad queue should be aligned in a straight line or a curved line, or whether the pad queue should be arranged against an edge of the arena, and so forth. The queue management instructions may also include instructions to connect to other pads in a requested order, for example, to prepare for railcars of a train to be loaded in the order the railcars are received. For example, in some embodiments, the pads in the queue may be coupled together such that a locomotive could push a plurality of railcars on to the pads prior to decoupling each railcar. In other embodiments, the pads of the queue may not be instructed to be coupled together, and a locomotive a push the railcars onto the pads individually, with each railcar being decoupled upon being loaded onto a pad.

Additionally, loading instructions may be provided to the pad by the external controller. For example, the loading instructions may include a preferred docking procedure, which may establish that certain brakes may be applied to one or more wheels of the pad to prevent the pad from slipping during loading, a height of the pad may be adjusted to a preferred height, sensors of the pad may be switched on or switched off, and/or other operational parameters of the pad may be adjusted. In some embodiments, the pad may transmit a confirmation to an external controller of the inbound docking station that the pad has securely docked and is ready to receive cargo, or a different type of communication. Similarly, once the cargo unit has been loaded on the pad, instructions may be transmitted by an external controller regarding how docking mechanisms and/or breaks may be released so that the pad may exit the inbound docking station.

In some embodiments, a docking protocol for entering and exiting the inbound docking station may include a transfer of information from the local controller of the pad to the external controller of the inbound docking station in several steps or stages. For example, the external controller may indicate to the local controller of the pad that the pad is cleared for docking at the inbound docking station; the local controller of the pad may indicate back to the external controller of the inbound docking station that the pad is proceeding with a docking protocol; the local controller of the pad may indicate to the external controller of the inbound docking station when the pad has successfully docked; the external controller of the inbound docking station may indicate to the local controller of the pad that the cargo unit will be proceeded to be loaded on the pad; the local controller of the pad may indicate to the external controller of the inbound docking station that the cargo unit has been securely loaded onto the pad; and the external controller of the inbound docking station may indicate to the local controller of the pad that the pad is free to exit the inbound docking station. In this way, the local controller of the pad in the external controller of the inbound docking station and/or a main external controller may work together to ensure an efficient loading and unloading process.

At step 414, the method includes transporting the cargo unit to an outbound docking station based on the received instructions, as described above. In various embodiments, a location of the outbound docking station may be identified in the original instructions provided to the local controller of the pad (e.g., at step 402). In other embodiments, the location of the outbound docking station may be transmitted to the local controller of the pad by an external controller after the cargo unit has been loaded on the pad.

At step 416, the method includes approaching and docking at the outbound docking station based on queue management and unloading instructions of the outbound docking station. In some embodiments, each inbound and outbound docking station may have an external controller that issues queue management and loading/unloading instructions specific to the corresponding inbound or outbound docking station. For example, a first, inbound docking station may have a first set of queue management and loading instructions that are transmitted to pads queuing up at the first, inbound docking station, and a second, outbound docking station may have a second set of queue management and unloading instructions that are transmitted to pads queuing up at the second, outbound docking station. The first set of queue management and loading instructions of the first, inbound docking station may reflect a lower amount of traffic experienced at the first, inbound docking station, while the second set of queue management and unloading instructions may reflect a higher amount of traffic experienced at the second, outbound docking station.

At step 418, the method includes determining whether the cargo has been damaged. If at step 418 it is determined that the cargo has not been damaged, the method proceeds to step 422. Alternatively, if it is determined at step 418 that the cargo has been damaged, the method proceeds to 420. At 420, the method includes attaching a repair flag to the cargo, and method 400 proceeds to step 422. The repair flag may indicate that an operator should review the cargo, for example, at a later stage in a movement of the cargo throughout the arena railyard system.

At step 422, the method includes unloading the cargo unit at the outbound docking station based on a received docking and unloading procedure, as described above in relation to step 412. As with the queue management and loading/unloading instructions, the received docking and unloading procedure may be transmitted by an external controller of the outbound docking station (or by a main external controller of the railyard), and may be different from docking and unloading procedures transmitted by other external controllers of the railyard.

Once the cargo unit has been unloaded, at step 424, the method includes sending status information of the pad to an external controller such as a main external controller. In some embodiments, the local controller of the pad may initiate the sending of status information to the external controller, while in other embodiments, the external controller may request the status information from the local controller of the pad. The status information of the pad may include a maintenance status of the pad. For example, the local controller of the pad may determine that the pad is due for scheduled maintenance, or may determine that maintenance should be scheduled to address damage inflicted on the pad during loading and/or unloading. Alternatively, the status information of the pad may include an indication that the pad has been assigned to a different designated inbound docking station to receive another cargo unit, or that the pad has not been assigned to a different inbound docking station or paired with another cargo unit, and that the pad is available for pairing with an arriving cargo unit. As another example, the status information may include an indication that a motor of the pad has overheated, and a request by the local controller of the pad that the pad be assigned temporarily to a storage area to cool off, or a different type of status information.

At step 426, the method includes following instructions issued by the external controller to the local controller of the pad. The instructions may be based on the status information transmitted to the external controller by the local controller of the pad, or based on different status information received or generated by the external controller in regard to the pad, or based on to traffic within the arena, or information transmitted by other external controllers of the railyard, manual input by an operator of one or more external controllers, or another source. For example, in response to the external controller determining based on status information of the pad that the pad should be scheduled for maintenance, the external controller may issue instructions to the pad to proceed to a maintenance area of the railyard (e.g., maintenance area 210 of FIG. 2) for the scheduled maintenance, or in response to the external controller determining that the pad is available to receive a new cargo unit, the external controller may issue instructions to the pad to proceed to a designated inbound docking station to receive the new cargo unit. The method may then end.

Thus, as described herein, redesigning a traditional railyard to use autonomous electric pads to transfer cargo units between docking stations and modes of transport may increase railyard efficiency. The free movement of the pads within an arena could expedite flexible, on-demand movement within the railyard. The introduction of pads into an arena-like infrastructure for a yard may eliminate a reliance on planning and classification, enabling trains to be broken and built on-demand, with flexibility and shorter notification times. Unlike in a traditional railyard, in the case of cemented arena, the entire railyard area may be utilized for the movement of goods, leading to an almost complete utilization of yard space. As a result, railroad companies may be able to better handle larger volumes of freight at a faster pace. Additionally, the proposed changes to railyard infrastructure may allow loading and unloading, inspections, and other activities that may take place at various locations in the railyard to be carried out at a smaller number of static locations, rather than having to relocate and accumulate transloading equipment at different destinations, thereby reducing complexity, wear, and communication over distances, while facilitating increased throughput and faster intermodal transfer of goods. One technical effect of redesigning a traditional railyard to use autonomous electric pads to transfer cargo units between docking stations and modes of transport is that railyard efficiency may be changed.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The disclosure also provides support for a method for managing a railyard, comprising: within the railyard, positioning a cargo unit on a multi-directional pad and moving the pad multi-directionally based on a requested order for the cargo unit relative to other cargo units. In a first example of the method, moving the pad multi-directionally based on the requested order comprises moving the pad multi-directionally based on an order of cargo units on railcars of an outbound train. In a second example of the method, optionally including the first example, moving the pad multi-directionally comprises: moving the pad in a forward direction, a reverse direction, a sideways direction, or a combination of the forward direction, the reverse direction, and the sideways direction, and rotating the pad in at least one of a clockwise direction or a counterclockwise direction. In a third example of the method, optionally including one or both of the first and second examples, the pad is a fully autonomous electric vehicle, and moving the pad multi-directionally includes allowing the pad to interact with and/or connect to other pads and/or elements of the railyard and react to the environment using on-board processing, communication, and sensing capabilities. In a fourth example of the method, optionally including one or more or each of the first through third examples, positioning the cargo unit on the multi-directional pad and moving the pad multi-directionally further comprises: moving the cargo unit from a first railcar of a first train to the pad, moving the pad to a second railcar of a second train, and moving the cargo unit from the pad to the second railcar. In a fifth example of the method, optionally including one or more or each of the first through fourth examples, positioning the cargo unit on the multi-directional pad and moving the pad multi-directionally further comprises: moving the cargo unit from a truck chassis to the pad, moving the pad to a railcar of a train, and moving the cargo unit from the pad to the railcar. In a sixth example of the method, optionally including one or more or each of the first through fifth examples, positioning the cargo unit on the multi-directional pad and moving the pad multi-directionally further comprises: moving the cargo unit from a railcar of a train to the pad, moving the pad to a location of a truck chassis, and moving the cargo unit from the pad to the truck chassis. In a seventh example of the method, optionally including one or more or each of the first through sixth examples, the pad operates within an arena, the arena having one of a liquid surface and a ground surface, where the pad moves along the liquid surface or the ground surface of the arena. In a eighth example of the method, optionally including one or more or each of the first through seventh examples, the ground surface of the arena is a concrete surface depressed into the ground such that a surface of the pad is level with a surface of the ground. In a ninth example of the method, optionally including one or more or each of the first through eighth examples, the pad is circular, and a diameter of the pad is greater than a longest railcar received at the railyard. In a tenth example of the method, optionally including one or more or each of the first through ninth examples, the pad communicates with other pads of the railyard and at least one supervisory controller of the railyard.

The disclosure also provides support for a method for a controller of a railyard system, comprising: receiving cargo units from a first mode of transport at one of a plurality of inbound docking stations located on an edge of a omni-directional surface of the railyard system, the omni-directional surface including a flat surface for maneuvering the cargo units, unloading the received cargo units from the first mode of transport and loading the received cargo units on a respective plurality of pads of the flat surface, each pad of the respective plurality of pads an autonomously operable and self-powered platform freely rotatable and movable on the flat surface, transporting the received cargo units from the one of the plurality of inbound docking stations to one or more of a plurality of outbound docking stations located on the edge of the omni-directional surface, unloading the transported cargo units from the respective plurality of pads and loading the transported cargo units on a second mode of transport at the one or more of the plurality of outbound docking stations. In a first example of the method, the first mode of transport is the same as the second mode of transport. In a second example of the method, optionally including the first example, the first mode of transport is different from the second mode of transport. In a third example of the method, optionally including one or both of the first and second examples, the method further comprises: commanding one or more loaded and/or unloaded pads to navigate to a pad storage/holding area of the flat surface. In a fourth example of the method, optionally including one or more or each of the first through third examples, transporting the received cargo units further comprises: in response to a pad of the respective plurality of pads receiving one or more instructions from the controller, the one or more instructions based on a requested order of cargo units on a train leaving the railyard system, navigating the pad along the flat surface to a location of the train based on the one or more instructions, pre-established traffic protocols, and signals received at sensors of the pad, and in response to the pad not receiving one or more instructions from the controller, navigating the pad along the flat surface based on one or more pre-established staging protocols, pre-established traffic protocols, and signals received at sensors of the pad. In a fifth example of the method, optionally including one or more or each of the first through fourth examples, the one or more instructions include instructions to queue up on the flat surface at an outbound docking station of the train based on the requested order of cargo units on the train.

The disclosure also provides support for a system, comprising: an autonomous vehicle configured to transport cargo from an inbound docking station of a first mode of transport of a railyard to an outbound docking station of a second mode of transport of the railyard, the inbound docking station and the outbound docking station positioned on a flat, omni-directional surface of the railyard, the autonomous vehicle operable on the flat, omni-directional surface. In a first example of the system, the autonomous vehicle is further configured to receive instructions wirelessly transmitted from a controller of the railyard, the instructions including a designated location for the autonomous vehicle to proceed to. In a second example of the system, optionally including the first example: the first mode of transport and the second mode of transport are one of a railcar, a truck, and a ship, and the cargo is one of a container, an empty trailer or truck chassis, and a loaded trailer or truck chassis.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for managing a railyard, comprising:
    within the railyard, positioning a cargo unit on a pad and moving the pad multi-directionally based on a requested order for the cargo unit relative to other cargo units,
    wherein the pad is an autonomous and self-powered platform that is freely rotatable and moveable on an omni-directional surface of the railyard, and
    wherein moving the pad multi-directionally comprises:
        moving the pad in a forward direction, a reverse direction, a sideways direction, or a combination of the forward direction, the reverse direction, and the sideways direction; and
        rotating the pad in at least one of a clockwise direction or a counterclockwise direction, including rotating the pad without simultaneously moving the pad in the forward direction, the reverse direction, the sideways direction, or the combination of the forward direction, the reverse direction, and the sideways direction.

2. The method of claim 1, wherein moving the pad multi-directionally based on the requested order comprises moving the pad multi-directionally based on an order of cargo units on railcars of an outbound train.

3. The method of claim 1, wherein the pad is an electric vehicle, and moving the pad multi-directionally includes allowing the pad to interact with and/or connect to other pads and/or elements of the railyard and react to the environment using on-board processing, communication, and sensing capabilities.

4. The method of claim 1, wherein positioning the cargo unit on the pad and moving the pad multi-directionally further comprises:
    moving the cargo unit from a first railcar of a first train to the pad;
    moving the pad to a second railcar of a second train; and
    moving the cargo unit from the pad to the second railcar.

5. The method of claim 1, wherein positioning the cargo unit on the pad and moving the pad multi-directionally further comprises:
    moving the cargo unit from a truck chassis to the pad;
    moving the pad to a railcar of a train; and
    moving the cargo unit from the pad to the railcar.

6. The method of claim 1, wherein positioning the cargo unit on the pad and moving the pad multi-directionally further comprises:
    moving the cargo unit from a railcar of a train to the pad;
    moving the pad to a location of a truck chassis; and
    moving the cargo unit from the pad to the truck chassis.

7. The method of claim 1, wherein the pad operates within an arena, the arena having one of a liquid surface and a ground surface, where the pad moves along the liquid surface or the ground surface of the arena.

8. The method of claim 7, wherein the ground surface of the arena is a concrete surface depressed into the ground such that a surface of the pad is level with a surface of the ground.

9. The method of claim 1, wherein the pad is circular, and a diameter of the pad is greater than a longest railcar received at the railyard.

10. The method of claim 1, wherein the pad communicates with other pads of the railyard and at least one supervisory controller of the railyard.

11. A method for a controller of a railyard system, comprising:
receiving cargo units from a first mode of transport at one of a plurality of inbound docking stations located on an edge of an omni-directional surface of the railyard system, the omni-directional surface including a flat surface for maneuvering the cargo units;
unloading the received cargo units from the first mode of transport and loading the received cargo units on a respective plurality of pads of the flat surface, each pad of the respective plurality of pads an autonomously operable and self-powered platform freely rotatable and movable on the flat surface, wherein freely rotatable and movable comprises:
movable in a forward direction, a reverse direction, a sideways direction, or a combination of the forward direction, the reverse direction, and the sideways direction; and
rotatable the pad in at least one of a clockwise direction or a counterclockwise direction, including rotating the pad without simultaneously moving the pad in the forward direction, the reverse direction, the sideways direction, or the combination of the forward direction, the reverse direction, and the sideways direction;
transporting the received cargo units from the one of the plurality of inbound docking stations to one or more of a plurality of outbound docking stations located on the edge of the omni-directional surface; and
unloading the transported cargo units from the respective plurality of pads and loading the transported cargo units on a second mode of transport at the one or more of the plurality of outbound docking stations.

12. The method of claim 11, wherein the first mode of transport is the same as the second mode of transport.

13. The method of claim 11, wherein the first mode of transport is different from the second mode of transport.

14. The method of claim 11, further comprising commanding one or more loaded and/or unloaded pads to navigate to a pad storage/holding area of the flat surface.

15. The method of claim 11, wherein transporting the received cargo units further comprises:
in response to a pad of the respective plurality of pads receiving one or more instructions from the controller, the one or more instructions based on a requested order of cargo units on a train leaving the railyard system, navigating the pad along the flat surface to a location of the train based on the one or more instructions, pre-established traffic protocols, and signals received at sensors of the pad; and
in response to the pad not receiving one or more instructions from the controller, navigating the pad along the flat surface based on one or more pre-established staging protocols, pre-established traffic protocols, and signals received at sensors of the pad.

16. The method of claim 15, wherein the one or more instructions include instructions to queue up on the flat surface at an outbound docking station of the train based on the requested order of cargo units on the train.

17. A system, comprising:
an autonomous vehicle configured to transport cargo from an inbound docking station of a first mode of transport of a railyard to an outbound docking station of a second mode of transport of the railyard, the inbound docking station and the outbound docking station positioned on a flat, omni-directional surface of the railyard, the autonomous vehicle being freely rotatable on the flat, omni-directional surface,
wherein the autonomous vehicle is configured to:
move in a forward direction, a reverse direction, a sideways direction, or a combination of the forward direction, the reverse direction, and the sideways direction; and
rotate in at least one of a clockwise direction or a counterclockwise direction, including rotating without simultaneously moving in the forward direction, the reverse direction, the sideways direction, or the combination of the forward direction, the reverse direction, and the sideways direction.

18. The system of claim 17, wherein the autonomous vehicle is further configured to receive instructions wirelessly transmitted from a controller of the railyard, the instructions including a designated location for the autonomous vehicle to proceed to.

19. The system of claim 17, wherein:
the first mode of transport and the second mode of transport are one of a railcar, a truck, and a ship; and
the cargo is one of a container, an empty trailer or truck chassis, and a loaded trailer or truck chassis.

* * * * *